United States Patent
Knutson et al.

(10) Patent No.: US 6,788,924 B1
(45) Date of Patent: Sep. 7, 2004

(54) POWER SAVING PROTOCOL FOR TDMA MULTI-LINE WIRELESS TELEPHONE HANDSETS

(75) Inventors: Paul Gothard Knutson, Indianapolis, IN (US); Kumar Ramaswamy, Indianapolis, IN (US)

(73) Assignee: Thomson Licensing S.A., Boulogne-Billancourt (FR)

( * ) Notice: Subject to any disclaimer, the term of this patent is extended or adjusted under 35 U.S.C. 154(b) by 0 days.

(21) Appl. No.: 09/581,148

(22) PCT Filed: Sep. 1, 1998

(86) PCT No.: PCT/US98/18061

§ 371 (c)(1),
(2), (4) Date: Nov. 16, 2000

(87) PCT Pub. No.: WO99/31811

PCT Pub. Date: Jun. 24, 1999

Related U.S. Application Data

(60) Provisional application No. 60/069,342, filed on Dec. 12, 1997.

(51) Int. Cl.[7] ............................... H04B 1/06; H04B 7/00
(52) U.S. Cl. .................... 455/265; 455/574; 455/343.2; 370/311
(58) Field of Search .................... 455/255, 257–259, 455/343.1–343.6, 208, 265, 574; 370/311, 350, 503, 508, 516, 518; 340/7.32, 7.38; 375/354

(56) References Cited

U.S. PATENT DOCUMENTS 4,005,266 A * 1/1977 Lehr et al. .................. 375/356
4,398,192 A   8/1983 Moore et al.
4,964,121 A   10/1990 Moore
5,150,361 A   9/1992 Wieczorek et al.
5,943,613 A * 8/1999 Wendelrup et al. ...... 455/343.1
5,991,279 A * 11/1999 Haugli et al. ................ 370/311
5,995,820 A * 11/1999 Young et al. ............. 455/343.1

FOREIGN PATENT DOCUMENTS

EP    661836    7/1995    ............ H04B/7/26
EP    726687    8/1996    ............ H04Q/7/32

OTHER PUBLICATIONS

European Search Report Dated Dec. 8, 1998.

* cited by examiner

*Primary Examiner*—Lee Nguyen
*Assistant Examiner*—Tuan A Tran
(74) *Attorney, Agent, or Firm*—Joseph S. Tripoli; Harvey D. Fried; Joseph J. Kolodka

(57) ABSTRACT

A wireless telephone system comprises a base unit having a base transceiver, and one or more wireless handsets, each handset comprising a handset transceiver. Each handset establishing a time-division multiple access (TDMA) link over a shared RF channel with the base unit via the base transceiver in accordance with a TDMA epoch, which allocates exclusive data and audio packet time slots to each handset. Each handset powers on its transceiver during its respective data and audio packet time slots as necessary to synchronize with the base unit using synchronization data transmitted with a data packet, to detect incoming call data transmitted with a data packet, or to transmit and receive audio information over the TDMA link. The handset powers off its transceiver otherwise during the epoch to minimize handset power use.

16 Claims, 3 Drawing Sheets

POWER SAVING PROTOCOL FOR TDMA MULTI-LINE WIRELESS TELEPHONE HANDSETS

CROSS REFERENCE TO RELATED APPLICATIONS

This continuation application claims the benefit of U.S. Provisional Patent Application Ser. No. 60/069,342 for Power Saving Protocol for TDMA (Time Division Multiple Access) Multiple-Line Cordless Phone Links, filed Dec. 12, 1997.

BACKGROUND OF THE INVENTION

1. Field of the Invention

The present invention relates to multi-line wireless telephone systems and, in particular, to techniques for saving power in battery-operated wireless handsets in wireless telephone systems.

2. Description of the Related Art

The use of telephones and telephone systems, including wireless telephone systems, is widespread. In wireless telephone systems, a cordless or wireless telephone handset unit communicates via either analog or digital radio signals with a base unit, which is typically connected via a standard telephone line to an external telephone network. In this manner, a user may employ the wireless handset to engage in a telephone call with another user through the base unit and the telephone network.

Multi-line wireless telephone systems are also in use in various situations, such as businesses with many telephone users. Such systems employ a handset that communicates with up to N handsets simultaneously, typically with digital communications schemes, such as a spread-spectrum, time division multiple access (TDMA). In a TDMA system, a single RF channel is used, and each handset transmits and receives data during a dedicated time slice or slot within an overall cycle or epoch. Efficient power use is important for a wireless system since the handsets are typically battery-powered.

Previous power-saving and other TDM-type arrangements for battery-powered devices are described in U.S. Pat. No. 4,964,121 (Moore), issued 16 Oct. 1990; U.S. Pat. No. 5,150,361 (Wieczorek et al.), issued 22 Sep. 1992; and European Pat. App. no. EP 0 726 687 A1 (Nokia Mobile Phones Ltd.), published 14 Aug. 1996. The Moore patent describes a TDM system in which the communication channel is divided into a predetermined number of time slots, wherein a remote communication unit may communicate with a central control station within an assigned time slot. Moore describes battery saving circuits of individual radios which may synchronously monitor centrally transmitted synchronization signals at their respective predetermined assigned time slots, but otherwise be in a substantially unenergized power saving mode of operation. The Wieczorek et al. patent describes a TDM system in which batter powered communication devices operate in energy saving mode to shut down nonessential circuits for a predetermined time interval, awaking to monitor one of two control slots of a repetitive time frame structure. The Nokia reference describes a radio telephone system in which the telephone maybe placed in an active condition during a polling burst but in sleep condition at other times.

SUMMARY

A wireless telephone system comprises a base unit having a base transceiver, and one or more wireless handsets, each handset comprising a handset transceiver. Each handset establishing a time-division multiple access (TDMA) link over a shared RF channel with the base unit via the base transceiver in accordance with a TDMA epoch, which allocates exclusive data and audio packet time slots to each handset. Each handset powers on its transceiver during its respective data and audio packet time slots as necessary to synchronize with the base unit using synchronization data transmitted with a data packet, to detect incoming call data transmitted with a data packet, or to transmit and receive audio information over the TDMA link. The handset powers off its transceiver otherwise during the epoch to minimize handset power use.

DESCRIPTION OF THE PREFERRED EMBODIMENT

Figure 1:
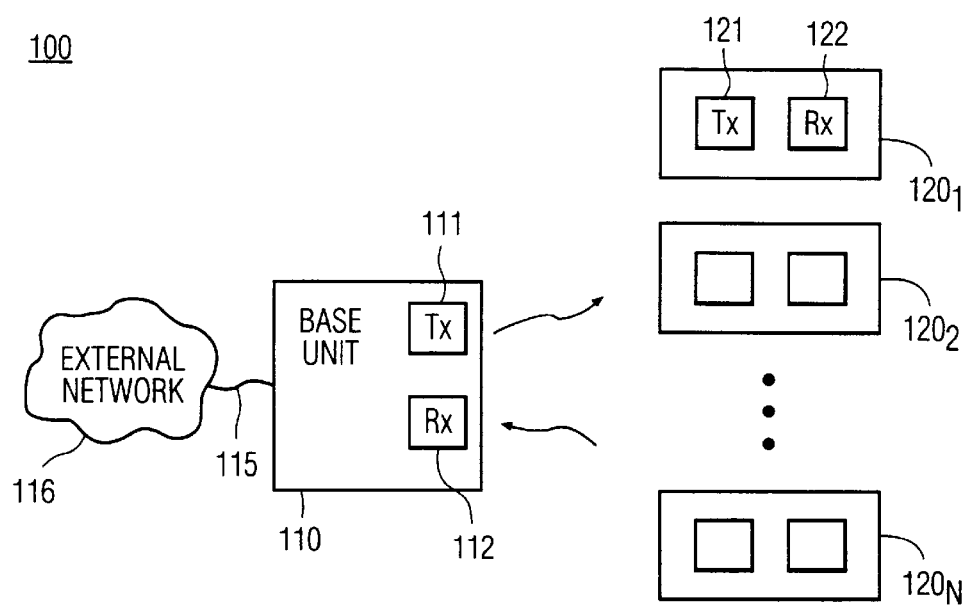
FIG. 1 is a block diagram of TDMA multi-line wireless telephone system, in accordance with an embodiment of the present invention.

Referring now to FIG. 1, there is shown a block diagram of TDMA multi-line wireless telephone system 100, in accordance with an embodiment of the present invention. TDMA system 100 comprises a base unit 110, which has receiver and transmitter units 112 and 111. respectively, and is coupled to external telephone network 116 via telephone line(s) 115. System 100 also comprises N wireless handsets $120_1$, $120_2$, ... $120_N$. Each has a transmitter and receiver unit (transceiver), such as transmitter 121 and receiver 122 of handset $120_1$. At any given time, some number (or none) of the handsets are operating or off-hook (i.e., in the process of conducting a telephone call). System 100 thus provides a wireless network between the base station 110 and each handset $120_i$ ($1 \leq i \leq N$). In one embodiment, system 100 comprises 4 handsets $120_1$–$120_4$, all of which may be active simultaneously. In another embodiment, system 100 comprises a different number of handsets, e.g. N=12, of which up to 8 can be active or operational at a time.

As explained above, efficient power use is important for a wireless telephone system since the handsets are typically battery-powered. In one embodiment, therefore, the present invention comprises a TDMA system and protocol for connecting multiple transceivers to a base station over a single RF channel. In particular, system 100 employs a digital TDMA scheme, as described in further detail below, which allows power to be efficiently used since each operating handset is "off" (i.e., not transmitting or receiving data, and thus not using as much battery power) during most portions of the TDMA epoch, and is only "on" during its own time slices or slots, as described in further detail below. In one embodiment, a handset powers off by switching off power to at least its CPU and transceiver (receiver and transmitter) units, while leaving powered on only a clock and associated timer or watchdog circuitry sufficient to wake up the CPU at a predetermined slot time.

However, use of a time-division multiplexing (TDM) technique such as TDMA, and switching each transceiver (handset) on only during its own time slots can give rise to various problems. For example, because handsets use an RF energy detector to sense when a signal is being transmitted from base station 110 to one of the handsets, communication intended for one handset may activate other handsets, causing unnecessary battery draining in those other handsets. In the present invention, therefore, the handsets are carefully synchronized so that each handset only "listens" for transmissions in its own time slots.

Without the present invention, there may be a tendency for the local time bases of the handsets to drift with time, which could result, after a period of time, in each handset listening to all transmissions to resynchronize to base unit 110. After such synchronization, the handset could be once again able to listen only in its time slot. However, since "listening" requires power, when synchronization is lost, there will be wasteful use of battery power. In addition, if synchronization is lost, the link integrity can be lost, due to signal collision, which occurs when multiple devices try to use a single RF channel at the same time.

Therefore, each handset $121_i$ employs the protocol of the present invention, as described in further detail below, to allow this switching on and off to occur, without loss of synchronization. The synchronization protocol of the present invention allows each remote, independent handset to use local time bases to synchronize to the TDMA sequence from the base station, synchronizing on certain transmissions from the base, and then listening only in the appropriate time slot.

Figure 2:
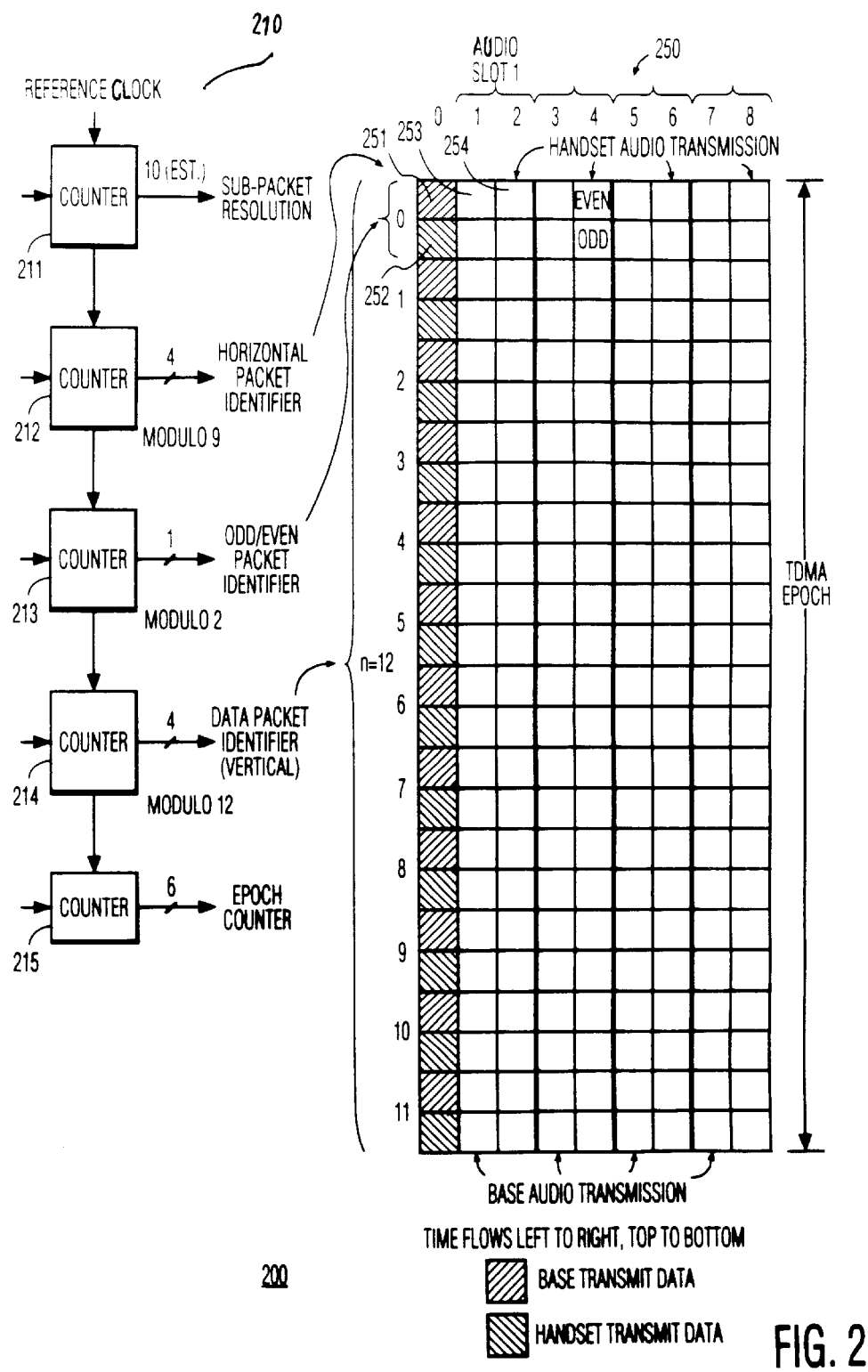
FIG. 2 is a schematic representation of the TDMA slot structure and handset counters used in the TDMA scheme of the system of FIG. 1, in accordance with an embodiment of the present invention.

Referring now to FIG. 2, there is shown a schematic representation of the TDMA slot structure 250 and handset counters 210 used in the TDMA scheme 200 of the system of FIG. 1, in accordance with an embodiment of the present invention. System 100 employs a TDMA epoch having structure 250, which is illustrated assuming 12 total handsets $120_1$–$1201_2$, of which 8 can be active or operational at a time, e.g. handsets $120_1$–$120_8$. TDMA epoch structure 250 comprises a number of rows and columns. Each row of TDMA structure 250 represents a 2 ms field of digital data, and is either even or odd and grouped in a pair with an odd or even, respectively, row or field. TDMA epoch structure 250 is a 48 ms epoch.

Each field of digital data comprises nine total packets: a data packet in the first column (either transmitted from the base or from a handset) and eight audio packet, grouped in 4 pairs of two. Each such pair of audio packets in a row includes one packet (time slot) of base audio transmission (to a given handset from base unit 110) and one packet of handset audio transmission (from the given handset to the base). Each data packet is a set of data transmitted either to a given handset from the base unit or vice-versa, during a discrete time slot during which time no other handsets receive or transmit data over the system's data channel. These data packets may contain various types of data, such as synchronization data or words with time stamp information transmitted to a handset in sleep mode, caller ID information, incoming call information, and the like. Data packets transmitted from a handset to the base may contain information such as the telephone number being dialed by the handset. Each audio packet is a set of audio data transmitted either to a given handset from the base unit or vice-versa, during a given time slot in the overall epoch, again during which time no other handsets receive or transmit data over the system's single RF channel.

Thus, for example, row pair 0 comprises an even row and odd row. In the even row, the base transmits data in the first time slot (slot 251), to one of the 12 handsets, e.g. handset $120_1$. There is one row pair in epoch 250 for each handset, so that each handset can receive and transmit data to base unit 110 once per epoch. After the first data slot 251, assuming handset $120_1$ is operational (off hook), an audio packet is transmitted to handset $120_1$ in audio packet slot 253, then an audio packet is transmitted by handset $120_1$ to base unit 110 in audio packet slot 254, and so on for 3 of the other handsets until the end of the field or row. In the odd row for row pair 0, data slot 252 is used to receive data transmitted from handset $120_1$ to base unit 110, and audio packets are transmitted for the remaining 8 active handsets. In row pairs 1–11, the same sequence occurs, except the data packets are to and from different handsets than for row pair 0.

In the present invention, a time base capable of resolving a fraction of a time slot over the period of several seconds is established in each handset which matches the TDMA slot timing in base unit 110. The TDMA epoch structure 250 is known by both each handset and the base, and once the time bases are synchronized, the handset receiver will know when it should listen for transmissions from the base, and it will know when it should send data back to the base. Keeping the TDMA slots known to within microseconds over a one second interval requires that a very stable and accurate reference be provided to operate this time base.

To eliminate collisions in the protocol, all handsets are given a designated data time slot, and audio time slots are allocated dynamically, according to which handset needs them. This information is communicated over the data channel (the first column of TDMA structure 250). The TDMA slots are divided into data and audio slots in a two-dimensional arrangement, as illustrated in FIG. 2 The base transmits synchronization packets to handsets in their respective data slots until a call is initiated.

Each handset maintains a cascade of counters 210, to keep local timing of each handset from drifting and thus in synchronization with the TDMA sequence. This is done be applying a reference clock signal to first counter 211 (all counters are initialized at some previous point, which initialization may proceed in stages). The reference clock signal is provided by a local clock in the handset, which is periodically adjusted as necessary, to correct for drifting, in accordance with time stamp synchronization information transmitted by base unit 110 during data packet slots. Counter 211 keeps track of sub-packet resolution, and identifies which bit of the packet is being processed, out of, for example, 100 bits per audio packet. Counter 212 keeps track of the horizontal packet, or time slot (i.e., the column number of the current row or field of TDMA epoch structure 250). Counter 213 keeps track of whether the current row is odd or even, and counter 214 keeps track of whether or not the current packet is a data packet or not, and which handset the data packet correlates with, and whether the data packet is to or from the base unit 110. Finally, counter 215 keeps track of which epoch the system 100 is in. This may be useful in requesting retransmission of corrupted data sent by base unit 110 during a certain epoch, for example.

The TDMA system of the present invention saves power by turning off most components of the handset, other than an internal clock and watchdog circuitry, for most of the TDMA epoch. The internal clock and protocol implemented by each handset ensures that synchronization is not lost, however, even though the handset is powered down. Thus, power is saved, but synchronization is not lost. Each handset may be in one of two states: in sleep mode, or operational mode.

In sleep mode, when the handset is on hook, only an internal clock and watchdog timer runs for most of the time, where the clock has previously been synchronized to the base unit clock and epoch. Thus, in sleep mode, the handset is configured so that it will wake up and "listen" for data during its assigned "receive data" slot, and turn off again thereafter if there is no incoming call. The wake up is caused by the watchdog timer counting down to a certain value, which switches on the CPU and other components necessary to listen for and/or transmit data. During this data slot, the handset receives synchronization data from base unit 110 and adjusts its internal clock, if necessary, to correct for any drifting. In the very next data slot, the handset may wake up again to acknowledge that it is alive and synchronized by transmitting a suitable "I'm alive" data message to base unit 110. Thus, in one embodiment, when in sleep mode, each handset is on for only two data packets of the entire TDMA epoch, a duty cycle of approximately 0.93% (2 slots/(9× 12×2 slots)) Powering up to allow the handset to listen to a data packet transmission from base unit 110 once every 48 ms epoch is sufficient to allow a handset to stay synchronized (i.e., to keep the communication loops in lock), and also to allow any incoming calls to be detected quickly enough to alert the user of incoming calls (e.g. to allow caller ID information to be viewed and/or calls to be answered in real time).

In an alternative embodiment, the handset skips a number of epochs entirely, and, for example, wakes up during its data slots only once during every 3rd epoch, as this will also be sufficient for synchronization and real time incoming call monitoring. This reduces the duty cycle further. The "I'm alive" message from the handset (e.g., transmitted in data slot 252) need not be transmitted every epoch, or even every epoch when the handset wakes up and listens to data from base unit 110. Preferably, these parameters are user programmable. For example, a handset may be programmed to wake up every 3rd epoch and listen during its data slot, and to transmit back an "I'm alive" message every 6th epoch. In this case, the base unit, which does not have similar power constraints, will nevertheless transmit synchronization data every epoch but will know that the handset is adequately synchronized as long as an "I'm alive" data message is received every 6 epochs. Otherwise, base unit 110 can assume that lock has been lost and can then try to restore the link, e.g. by transmitting data/sync packets to the lost handset at three increasing power levels, during its respective data packet slot. Lock may be lost, for example, when the handset battery is changed, or when the handset stays out of range for a duration longer than handset TDMA timing can tolerate. This effectively increases the dynamic range of the system. For example, with 30 dB of power control and 70 dB of automatic gain control (AGC), the system can acquire lock over a 100 dB dynamic range.

If a handset detects an incoming call during the data slot of one of the epochs in which it listens, it can ring and enter operational mode to allow audio communication. Additionally, if a user turns on the handset to place a call, the handset also enters operational mode and transmits appropriate data to the base unit.

In operational mode, when a handset is off hook and being used, it is deactivated during most of the TDMA epoch, as in sleep mode, except that it turns on once for each epoch during the two data slots for the handset, and also turns on for two audio packets (an audio packet pair) for every field in which it is allocated an audio slot pair. For example, if handset 120₁ is operational, it will be on for data slots 251, 252 for each epoch, and also for the first two audio slots of the even row of each row pair (24 audio slots total). Thus, in one embodiment, when in operational mode, each handset is on for only two data packets and 24 audio packets of the entire TDMA epoch, a duty cycle of approximately 12% (26 slots/(9×12×2 slots)) (assuming 8 handsets are operational, so that a given handset has 2 audio slots every other field, instead of every field).

In both sleep and operational modes, therefore, the TDMA scheme and power saving protocol of the present invention provides for power to be efficiently used since each operating handset is off and thus not consuming much power, for most of the time (whether in sleep mode or off hook). This protocol is described in further detail below with reference to FIG. 3.

Figure 3:
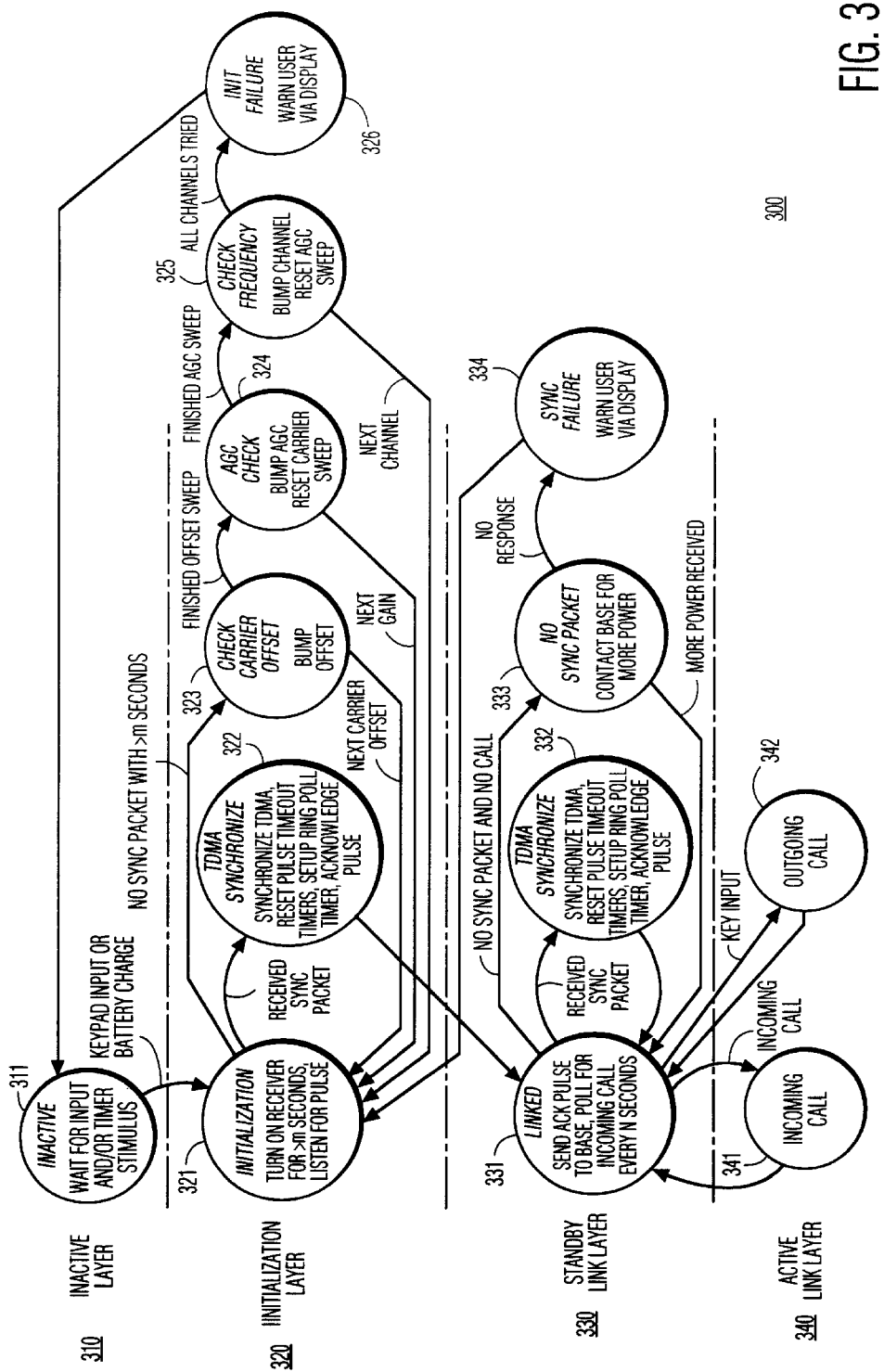
FIG. 3 is a state diagram of the power saving protocol implemented by each handset of the telephone system of FIG. 1, in accordance with an embodiment of the present invention.

Referring now to FIG. 3, there is shown a state diagram of the power saving protocol 300 implemented by each handset 120ᵢ of telephone system 100 of FIG. 1, in accordance with an embodiment of the present invention. Protocol 300 comprises 4 layers: inactive layer 310, initialization layer 320, standby link layer 330, and active link layer 340. Inactive layer 310 occurs when handset 120ᵢ is out of contact with base unit 110. Initialization layer 320 occurs as the link is being established, i.e., when the handset is in the process of finding the RF channel, the carrier and timing offsets necessary to use the RF channel, and finally, the TDMA reference for the epoch. Standby layer 330 is used when the base and handset have obtained synchronization lock, and active link layer 340 exists when there is active audio communication. Thus, standby layer 330 corresponds to sleep mode and active link layer 340 corresponds to operational mode.

There are three reasons for being in inactive layer 310 (inactive state 311). First, if the handset or base is without power (power failure or battery changes in the handset); second, if the handset is turned off (unpowered); and third, the handset is out of range. Thus, the inactive layer 310 occurs when the handset has been out of synchronization for an extended period, such as battery changes, or staying out or range longer than local TDMA sync can hold. There are two ways to leave the inactive layer and begin initialization state 321 in initialization layer 320: first, the user can trigger the handset, initiating a search for the synchronization pulses transmitted by the base unit 110 for that handset during its respective data slot; second, the handset periodically self-initiates a search. However, such a search is a power hungry operation, requiring continuous operation of the receiver.

Therefore, in a preferred embodiment, power usage is limited by reducing the frequency of self-initiated searches to once every several minutes. This allows an inactive handset to recover automatically in the event of base power failure. This technique thus provides a low cost alternative to base battery backup, and allows automatic recovery if the signal was lost because of straying out of range, without excessive battery drain. Thus, in the inactive layer, the handset may be configured to do nothing, until the user initiates establishment of a link, or a periodic timer stimulates the handset to search for the base's sync packet transmission. The base contiguously transmits synchronization packets at three different power levels when a link is in the inactive layer, as described previously.

Once the handset correlates to a base signal and leaves the inactive layer 310, the signal must be demodulated, and the handset must check to determine whether it belongs to the base it received a signal from, and it must also exchange time stamp information to synchronize the base and handset TDMA timers (states 321, 322 of initialization layer 320). Once the channel and TDMA timers are tuned, the link can reach standby link layer 330 (state 331). Time stamps are exchanged between the handset and base until the timing error is below a threshold value, at which point linked state 331 is achieved.

In standby/sleep mode, while the handset is "linked," the handset checks in only periodically with base 110 (i.e., every n seconds or m epochs) to receive a sync packet (data packet having synchronization data), at which point TDMA synchronize state 332 is entered in order to synchronize the local clock. Time stamps are transmitted in the sync packet to allow the handset to keep the TDMA time in sync with the base. An "I'm alive" acknowledgment pulse may be transmitted back to base unit 110 when such a sync packet is successfully received. If the base fails to receive an acknowledge often enough, the link is considered broken by the base, and it will begin transmission at multiple power levels, as in the inactive layer.

Active communication (operational mode) occurs when the handset initiates a call (state 331 goes to state 342), or when the base requests that a handset answer a call (state 331 goes to state 341). Since the link is operating, these are initiated by the exchange of data packets. The data packet indicates that a call is coming in, and the base always monitors handset transmissions. During active communication, time stamps are not exchanged, but TDMA synchronization is maintained by examining the presence and absence of communication packets. The point where sequential correlation peaks have been observed until when they disappear provides and edge that gives a robust indication of the phase of the TDMA timer. Since packets occur consistently during active communication, TDMA phase is maintained by examining the edges of packets.

TDMA frequency lock is important only for long periods without communication, such as what occurs in the standby link layer 330 (sleep mode), since the frequency reference is typically provided by a very accurate quartz crystal oscillator in both the handset and base. Upon completion of a call, time stamps will be exchanged in standby link layer 330 to occasionally adjust the local clock so as to maintain TDMA reference frequency lock. The unadjusted TDMA time base is still quite accurate, being derived from a quartz oscillator, and will time out TDMA slots over an epoch with plenty of margin. By adjusting the time base with a time stamp based frequency locked loop, the time base will be accurate over several TDMA epochs, allowing the handset to poll for data at a minimal rate.

One advantage of the protocol of the present invention is that, once synchronized, the handset need only poll the specific data time slot where ring and time stamp data would be transmitted. The handset does not even need to poll every epoch, as the protocol will allow the user many epochs to respond to an incoming call, and many epochs can pass before the base will consider the handset out of sync. The sync packets contain time stamps to keep the TDMA links frequency locked, and the edges of the data packets keep the TDMA links phase locked. In the TDMA system of the present invention, assuming a 1 second poll rate (about 20 TDMA data epochs) for incoming calls, this amounts to a handset receiver 122 on duty cycle of about 0.02% (200 µs/packet). Acknowledging would run the handset transmitter 121 at the same rate.

One skilled in the art will recognize that the wireless system described above according to the principles of the invention may be a cellular system where base unit 110 represents a base station serving one of the cells in a cellular telephone network.

It will be understood that various changes in the details, materials, and arrangements of the parts which have been described and illustrated above in order to explain the nature of this invention may be made by those skilled in the art without departing from the principle and scope of the invention as recited in the following claims.

What is claimed is:

1. A wireless telephone system, comprising:
   a base unit having a base transceiver; and
   one or more wireless handsets, each handset comprising:
   a handset transceiver that establishes a time-division multiple access (TDMA) link over a shared RF channel with the base unit via the base transceiver in accordance with a TDMA epoch divided into data and audio packet time slots which are allocated to each handset, wherein each handset may be in one of an operational mode and a sleep mode,
   a clock;
   counters; and
   a timer; the clock, counters and timer remaining operational when the handset transceiver is powered off, the clock and counters maintain synchronization between the handset and the base unit,
   wherein when the handset is in the sleep mode, the handset powers on its transceiver in response to the timer, only during its respective receive data time slot of every Nth epoch, to receive a data packet and to re-synchronize the clock with the base unit using synchronization data contained in the received data packet;
   while in the sleep mode, after receiving the data packet and after re-synchronizing the clock the handset transmits a data packet to the base unit during the next transmit data time slot for the handset to notify the base unit that the handset is still synchronized with the base unit, the handset being operable to maintain synchronization with the base unit, the clock and counters over a time period lasting at least N epochs without receiving synchronization data from the base unit.

2. The system of claim 1, wherein if the base unit does not receive the data packet from a handset to notify the base unit that the handset is still synchronized with the base unit, after the base unit has transmitted a data packet to the handset containing synchronization information during an Nth epoch, then the base unit attempts to restore synchronization with the handset by transmitting subsequent data packets to the handset with synchronization information during the transmit data time slot.

3. The system of claim 1, wherein after receiving the data packet during the receive data time slot of an Nth epoch when the handset is in sleep mode and after re-synchronizing the clock using synchronization data contained in the received data packet, the handset transmits a data packet to the base unit during the next transmit data time slot for the handset, only during every N*kth epoch, where k is an integer greater than 1, to notify the base unit that the handset is still synchronized with the base unit.

4. The system of claim 1, wherein N is selected so that the handset is able to maintain synchronization with the base unit with the clock and cascade of counters over a time period lasting at N epochs without receiving synchronization data from the base unit and also so that the handset is able to perform real-time call monitoring by detecting incoming call data transmitted with a data packet.

5. The system of claim 1, wherein N is a user programmable parameter.

6. The system of claim 1, wherein N>1.

7. The system of claim 1, wherein, the handset is in the operational mode when the handset is off hook and is in the sleep mode when the handset is on hook.

8. The system of claim 1, wherein:
the epoch has a plurality of transmit and receive data row pairs, one such row pair for each handset; and
each handset, when in operational mode, receives and transmits data packets via receive and transmit data packet slots only once during each epoch, during the transmit and receive data row pair for each said operational handset, and receives and transmits audio packets during allocated audio time slots of the epoch for the handset.

9. The system of claim 1, wherein:
each handset is always in a state within one of the following layers: an inactive layer: an initialization layer, a standby link layer, and an active link layer;
the inactive layer occurs when the handset is out of contact with the base unit;
the initialization layer occurs as a TDMA link is being established between the handset and the base unit;
the standby link layer occurs when the base unit and handset have obtained synchronization lock, and comprises the sleep mode; and
the active link layer occurs when there is active audio communication between the handset and the base unit and comprises the operational mode.

10. A wireless telephone system, comprising:
a base unit having a base transceiver; and
one or more wireless handsets, each handset including a handset transceiver for establishes a time-division multiple access (TDMA) link over a shared RF channel with the base transceiver according to a TDMA epoch divided into data and audio packet time slots allocated to each handset, each handset being in one of an operational mode and a sleep mode and including a clock, counters, and a timer; the clock, counters and timer remaining operational when the handset transceiver is powered off, and the clock and counters maintaining synchronization between the handset and the base unit,
wherein during the sleep mode the handset transceiver is powered and responsive to the timer during its respective receive data time slot of every Nth epoch to receive a data packet and to re-synchronize the clock with the base unit using synchronization data contained in the received data packet and after receiving the data packet and after re-synchronizing the clock the handset transmits a data packet to the base unit during the next transmit data time slot for the handset to notify the base unit that the handset is still synchronized with the base unit.

11. The system of claim 10, wherein the handset is operable to maintain synchronization between the base unit, clock and counters over a time period lasting at least N epochs without receiving synchronization data from the base unit.

12. The system of claim 11, wherein if the base unit does not receive the data packet from a handset to notify the base unit that the handset is still synchronized with the base unit, after the base unit has transmitted a data packet to the handset containing synchronization information during an Nth epoch, then the base unit attempts to restore synchronization with the handset by transmitting subsequent data packets to the handset with synchronization information during the transmit data time slot.

13. The system of claim 1, wherein N is selected so that the handset is able to maintain synchronization with the base unit with the clock and cascade of counters over a time period lasting at N epochs without receiving synchronization data from the base unit and also so that the handset is able to perform real-time call monitoring by detecting incoming call data transmitted with a data packet.

14. The system of claim 11, wherein N is a user programmable parameter.

15. The system of claim 11, wherein N>1.

16. The system of claim 11, wherein, the handset is in the operational mode when the handset is off hook and is in the sleep mode when the handset is on hook.

* * * * *